United States Patent [19]

Fujii

[11] Patent Number: 5,224,005
[45] Date of Patent: Jun. 29, 1993

[54] TAPE REEL LOCKING AND RELEASING DEVICE

[75] Inventor: Hiroshi Fujii, Tokyo, Japan

[73] Assignee: Sony Corporation, Tokyo, Japan

[21] Appl. No.: 835,401

[22] Filed: Feb. 14, 1992

[30] Foreign Application Priority Data

Feb. 19, 1991 [JP] Japan .................. 3-045506

[51] Int. Cl.⁵ .......................................... G11B 23/087
[52] U.S. Cl. .................................................. 360/132
[58] Field of Search ......................... 360/132; 242/199

[56] References Cited

U.S. PATENT DOCUMENTS 5,056,735  10/1991  Gelardi et al. ..................... 360/132

Primary Examiner—Robert S. Tupper
Attorney, Agent, or Firm—William S. Frommer; Alvin Sinderbrand

[57] ABSTRACT

In a tape reel locking and releasing device for a tape cassette having a reel locking member which is slidable between a locking position and releasing position and is urged resiliently by a torsion spring toward the locking position, a cavity is formed in the slidable locking member to receive a release pin of a tape player which is inserted into the cavity through an aperture formed in a bottom wall of the cassette case, and a projection extends downwardly from the reel locking member into the aperture and is contiguous to the cavity. An inclined plane is formed in the cavity and extends therefrom to the lower end of the projection with the release member being brought into initial pressed contact with the lower end of the inclined plane on the projection. The inclined plane can be lengthened without the necessity of extending its upper end and or increasing the gradient of the inclined plane to consequently ensure a sufficient shift length of the slidable locking member, hence achieving exact locking and releasing operations.

4 Claims, 10 Drawing Sheets

TAPE REEL LOCKING AND RELEASING DEVICE

BACKGROUND OF THE INVENTION

1. Field of the Invention

The present invention relates to a novel tape reel locking and releasing device for use in a tape cassette and, more particularly, to a mechanism for achieving an exact operation of locking and releasing a pair of tape reels.

2. Description of the Prior Art

It is generally customary in a tape cassette that, for the purpose of preventing any slackening of a tape during storage or transport, there is provided a reel locking device capable of inhibiting undesired rotation of tape reels around which the tape is wound.

An exemplary reel locking device of such type is equipped with a slide member which is so disposed as to be movable between a lock position and a release position and is resiliently urged toward the lock position. A known example is concerned with a tape cassette employed in an 8-mm VCR (video cassette recorder) or the like as disclosed in U.S. Pat. No. 4,579,295.

A conventional reel locking/releasing device a of such type is shown in FIG. 9A, 9B and 10.

A slide member b is shaped into a block with a recess c open at a bottom surface thereof. A lower portion e under an intermediate region of a back surface d of such recess c is formed into an inclined plane which is displaced backward as it extends downward. A compression coil spring h is provided between the slide member b and a back wall g of a cassette case f to apply a resilient force for moving the slide member b forward.

The slide member b has a lock element (not shown) which is brought into engagement with teeth (not shown) of a tape reel when the slide member b is moved forward, thereby locking the tape reel to prevent its rotation.

An insertion aperture i is formed in a bottom wall j of the cassette case f, and the recess c formed in the slide member b opens to the outside of the cassette case f through such aperture i.

For releasing the tape reel from the locked state in the reel locking/releasing device a, there are the following two methods.

According to the first method, as illustrated in FIG. 9(A), a release pin k provided in a tape player is inserted into the recess c in the slide member b through the aperture i when the tape cassette is loaded at a predetermined position in the tape player. Subsequently, as illustrated in FIG. 9(B), the release pin k is shifted backward to press the back surface d of the recess c, whereby the slide member b is moved backward to release the tape reel.

According to the second method, as illustrated in FIG. 10, a release pin l provided in a tape player is inserted vertically upward into the recess c in the slide member b through the aperture i when the tape cassette is loaded at a predetermined position, and during such inserting operation, the top end of the release pin l butts against the inclined plane e of the recess c, whereby the inclined plane e is pressed relatively backward. Consequently the slide member b is moved backward to release the tape reel from the locked state.

In the conventional reel locking/releasing device a for a tape cassette shown in FIGS. 9A, 9B and 10, there may occur an occasion where the locking action is rendered uncertain or the locked reel fails to be completely released.

In the method of FIG. 10, the shift of the slide member b caused by butting of the release pin l against the inclined plane e may be insufficient in length, so that the locked reel may fail to be completely released. Furthermore, if the structure is so modified as to attain a completely unlocked state, the locking action may be rendered incomplete to the contrary.

For realizing a greater length of such shift, there may be contrived a means to lengthen the inclined plane by extending the plane up to a higher position or by increasing the gradient of the plane.

However, since the length of projection of the release pin l into the cassette case f is limited, it is practically difficult to adopt the above method of extending the inclined plane up to a higher position. And if the gradient of the inclined plane is increased, the slidability between the release pin l and the inclined plane e is deteriorated to consequently bring about an improper operation.

OBJECT AND SUMMARY OF THE INVENTION

It is an object of the present invention to avert any improper locking or releasing operation by ensuring a sufficiently great length of movement of a slide member.

According to one aspect of the present invention is a device for locking and releasing a pair of tape reels rotatably disposed in a cassette housing with a tape is wound around the tape reels, and which is provided with gear teeth formed on entire peripheries of the tape reels; a pair of engaging members movably mounted in the cassette housing so as to be engageable with and disengageable from the gear teeth of the tape reels; a reel locking member slidable in the cassette housing between a locking position and a releasing position and acting on the engaging members to cause disengagement thereof from the gear teeth in response to sliding of the reel locking member to its releasing position, the reel locking member having a cavity into which an operating member disposed in a signal recording/reproducing apparatus is inserted through an aperture formed in a bottom wall of the cassette housing, so as to move the reel locking member to its releasing position and thereby disengage the engaging members from the gear teeth; and means for resiliently urging the slidable reel locking member to its locking position for bringing the engaging members into engagement with the gear teeth: the reel locking member has a projection extending downwardly therefrom into the aperture contiguous to the cavity and the cavity of the slidable reel locking member has an inclined plane portion extending over the projection and facing downwardly and generally in a direction toward the locking position, with the operating member being pressed against the inclined plane portion so that the top of the operating member is firstly engaged with an end port of the inclined plane portion on the projection. The height of the projection is desirably substantially equal, to the thickness of the bottom wall of the cassette half.

Thus, in the tape reel locking and releasing device of the present invention, the inclined plane embodying the slide member can be lengthened without the necessity of extending the upper end of the plane or increasing the gradient thereof, so that a sufficiently long shift of the slide member can be achieved to avoid any incomplete locking or releasing action.

DESCRIPTION OF THE PREFERRED EMBODIMENT

Hereinafter a tape reel locking/releasing device according to the present invention for use in a tape cassette will be described in detail with reference to an exemplary embodiment thereof shown in FIGS. 1 through 8.

Figure 4:
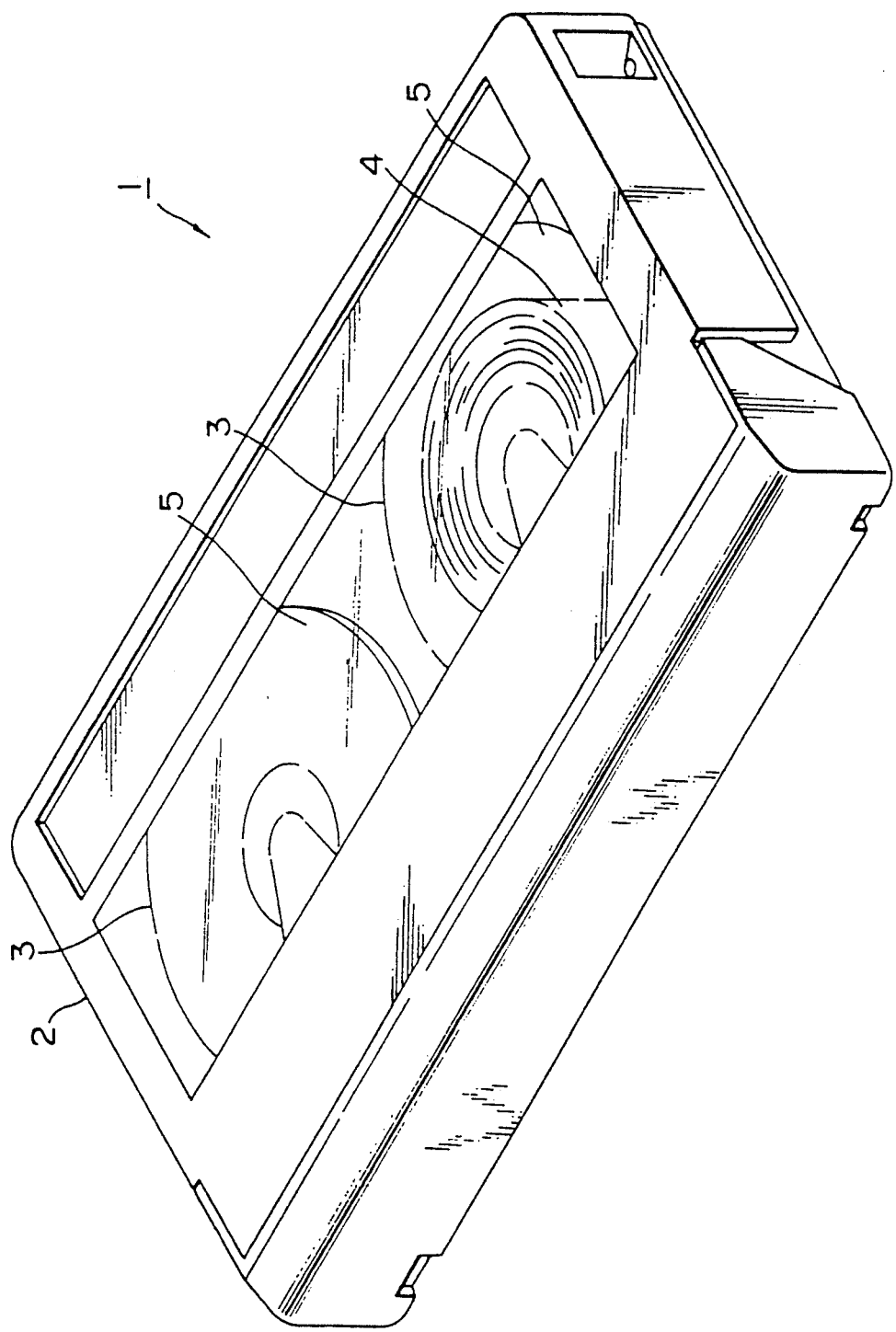
FIG. 4 is a schematic perspective view of the tape cassette.
Figure 5:
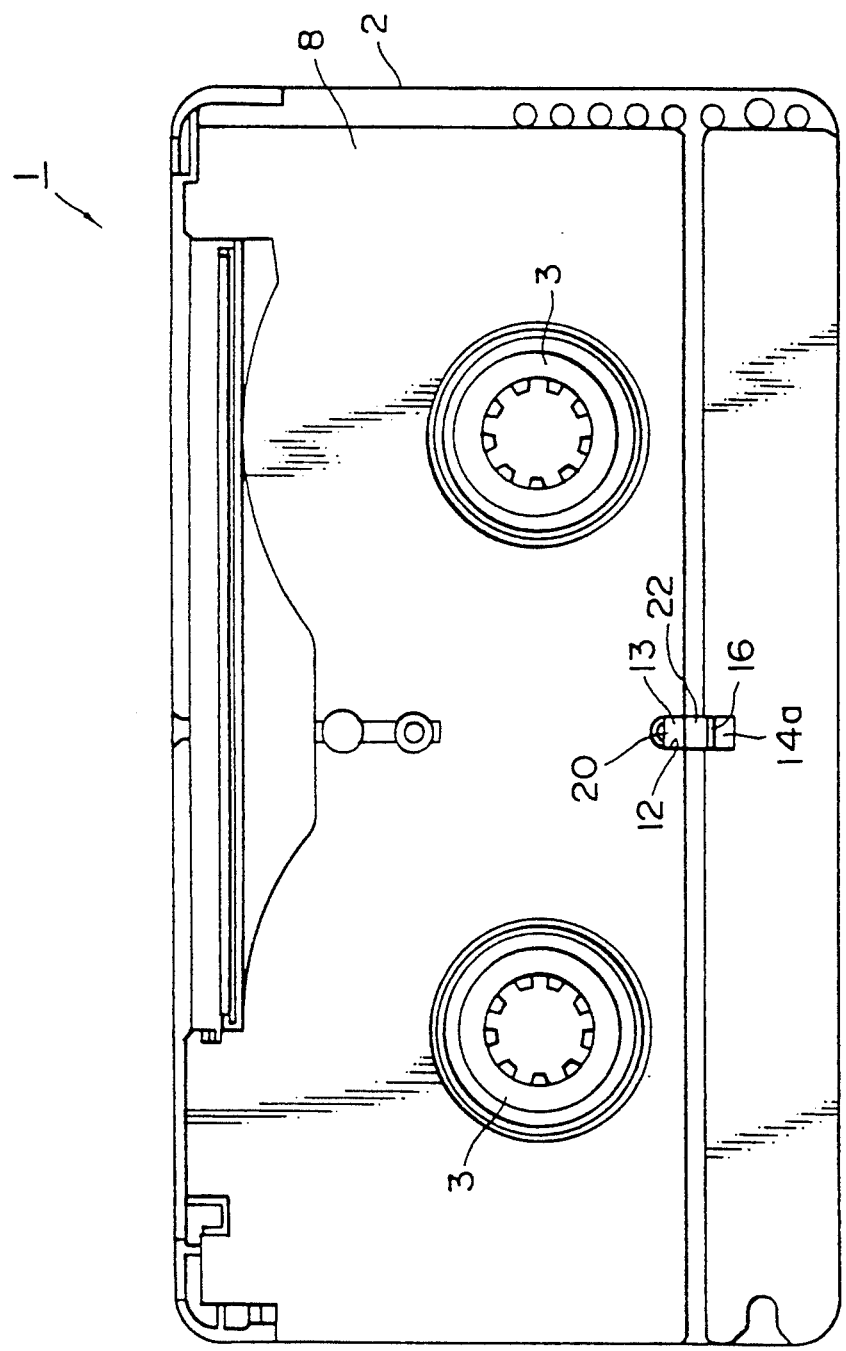
FIG. 5 is a bottom view of the tape cassette.

Denoted by reference numeral 1 in FIGS. 4 and 5 is a tape cassette having the reel locking/releasing device of the present invention is employed in a cassette case 2. A pair of tape reels 3, 3 are housed in the cassette case 2 rotatably at positions spaced apart from each other, and a magnetic tape 4 is wound around the reels 3, 3.

Figure 8:
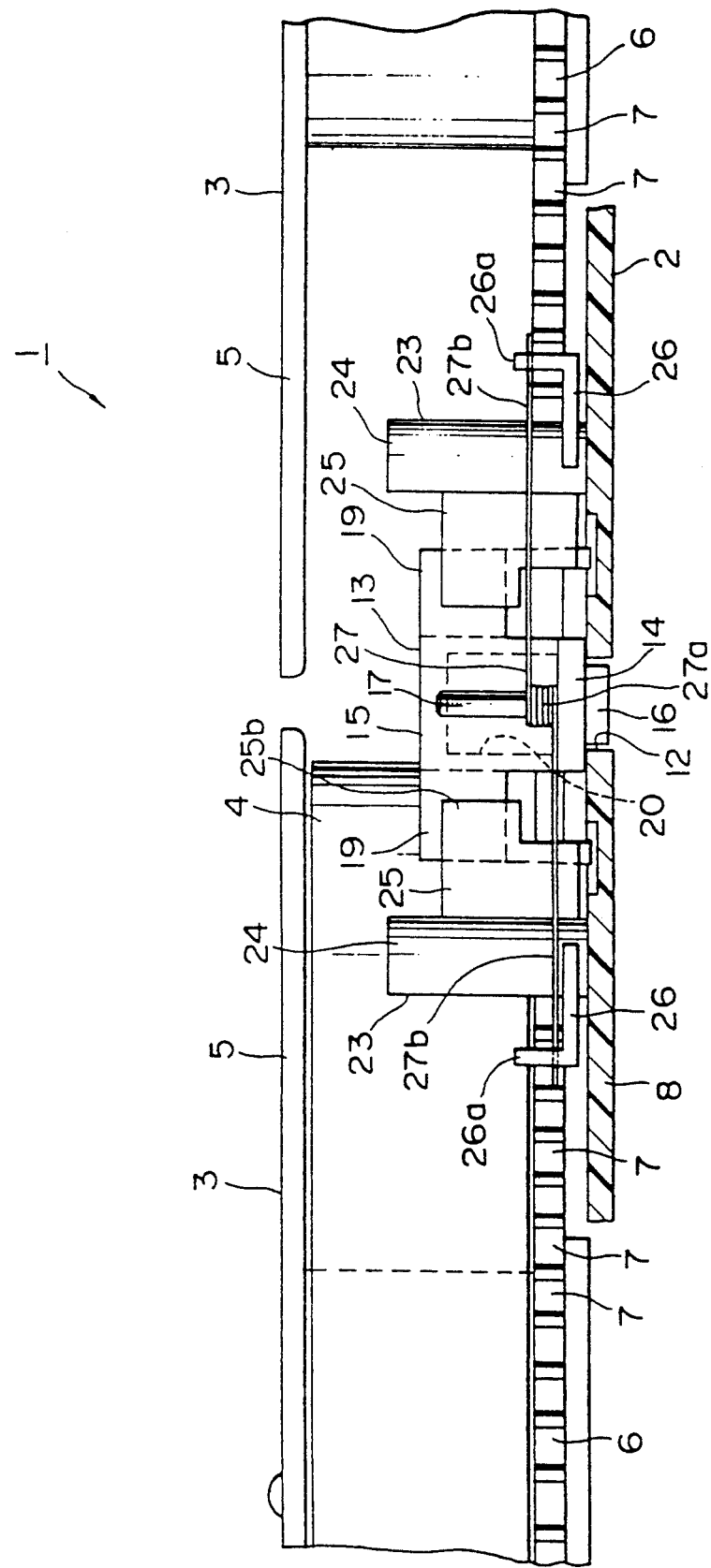
FIG. 8 is an enlarged back view of the principal components.
Figure 9A:
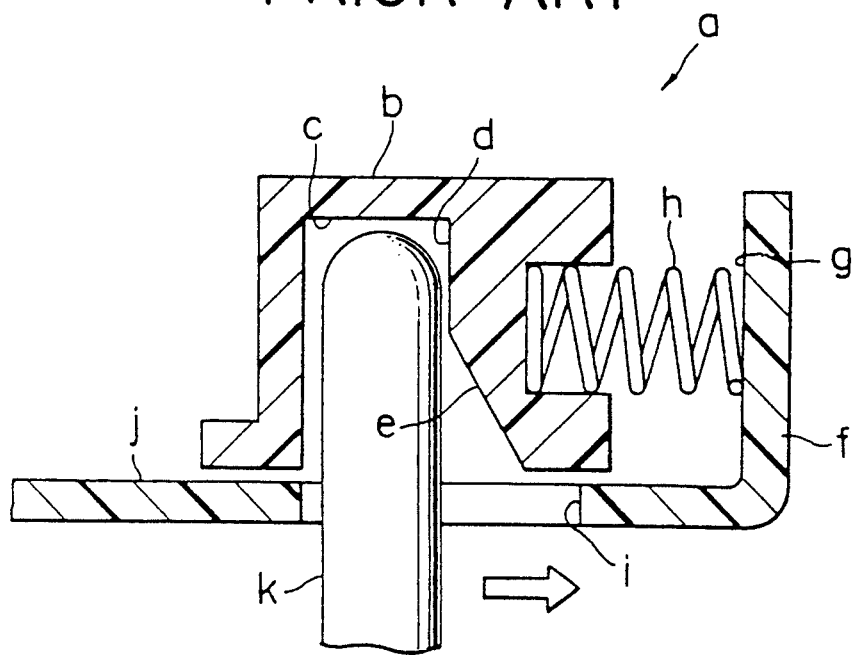
FIGS. 9A and 9B are enlarged sectional views of a conventional reel locking/releasing device shown in locked and released positions, respectively in a tape cassette.
Figure 9B:
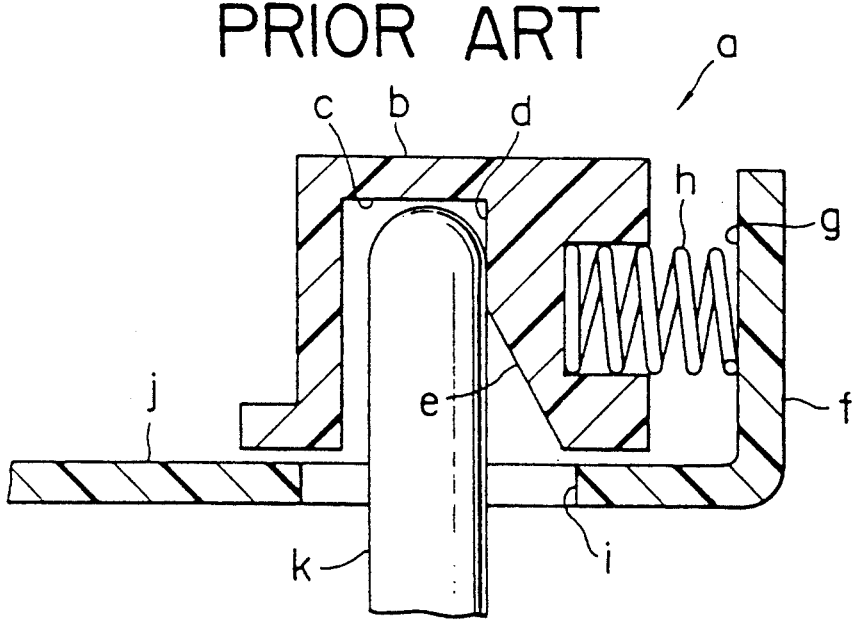
Figure 10:
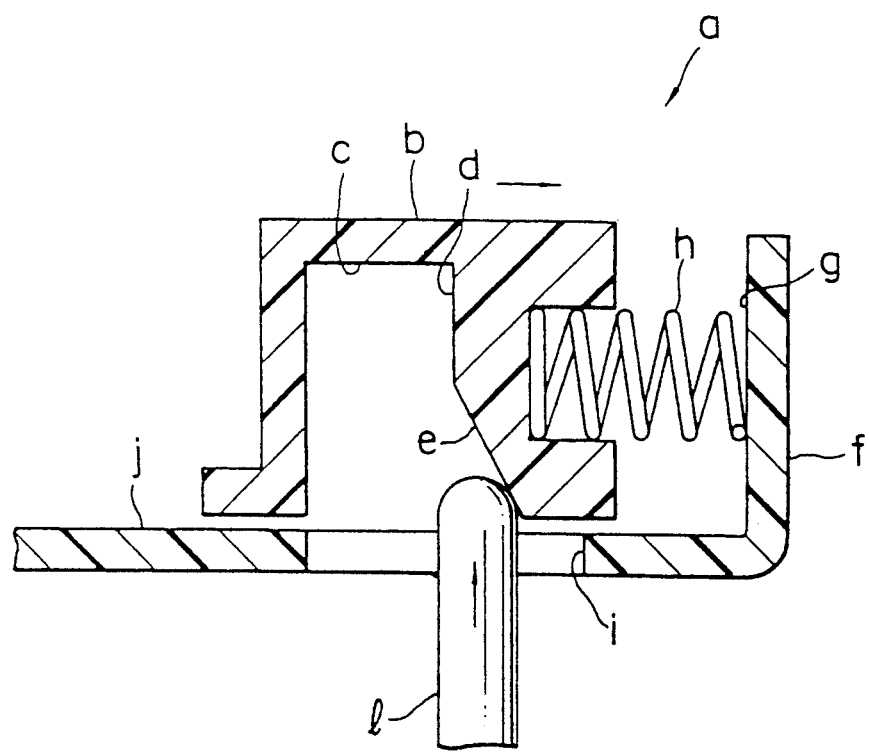
FIG. 10 is an enlarged sectional view illustrating another method of releasing the conventional reel locking/releasing device in a tape cassette.

The tape reels 3, 3 have upper and lower flanges 5, 5 and 6, 6 respectively, and engaging gear teeth 7, 7, ... are formed on the entire peripheries of the lower flanges 6, 6 (FIG. 8). A tape cassette similar in structure to the above is disclosed in U.S. patent application Ser. No. 748,520 filed by the same assignee on Aug. 22, 1991.

Figure 6:
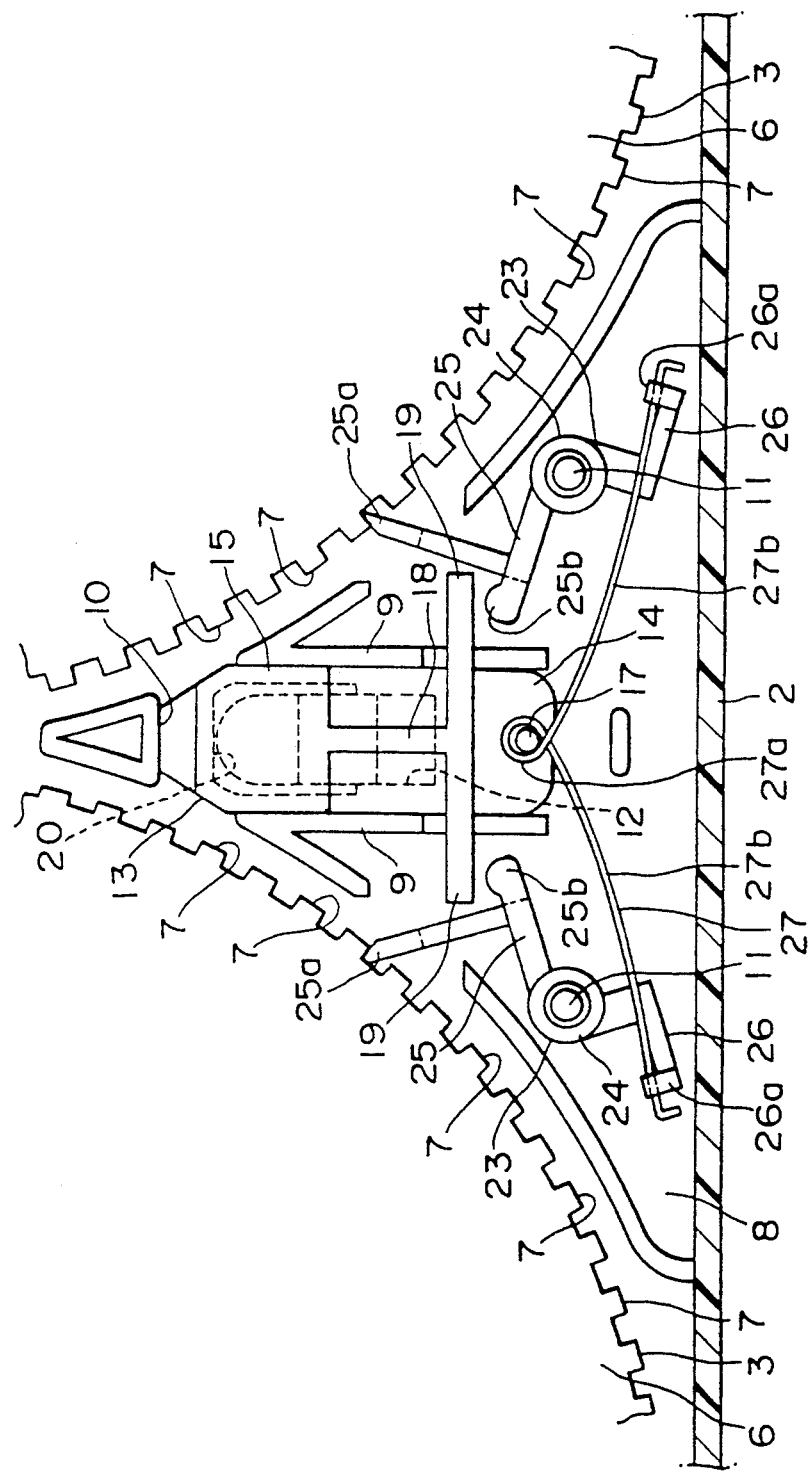
FIG. 6 is an enlarged plan view of the principal components in a locked state.
Figure 7:
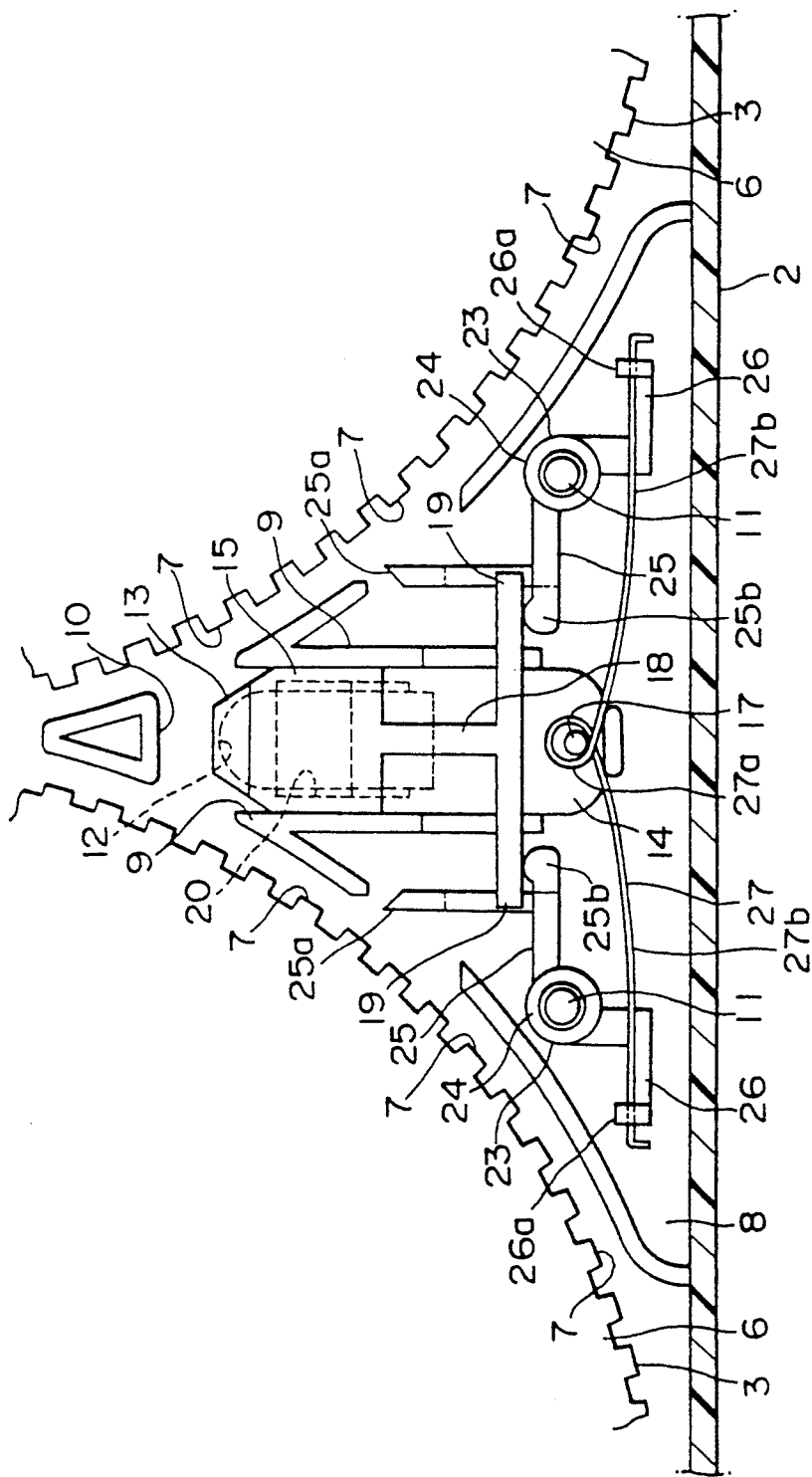
FIG. 7 is an enlarged plan view of the principal components in a released state.

In FIGS. 6 and 7, mutually parallel guide walls 9, 9 are provided upright on rear central regions of a bottom wall 8 of the cassette case 2 in a manner to extend longitudinally while being spaced apart transversely from each other, and a stopper wall 10 is provided in front of the space between the guide walls 9 and 9. Also on the bottom wall 8, there are provided support pins 11, 11 upright at positions spaced apart sideward from the rear ends of the guide walls 9, 9. Furthermore, an insertion aperture 12 is formed between the guide walls 9, 9 at a position closer to the front ends thereof and is elongated parallel to the walls 9.

In FIGS. 1 through 3 and 8, a slidable locking member 13 is composed of synthetic resin in a manner to have an integral base 14 in the form of an elongate plate, a main portion 15 projecting upward from a position proximate to the front end of the base 14, and a projection 16 formed on the lower surface of the base 14 at a position slightly closer to the rear of the base 14 than the center thereof.

A support pin 17 is provided upright in a rear end region of the base 14. A plate-shaped support element or web 18 extends rearwardly from the main portion 15 of the base 14 (FIGS. 6 and 7) to pressers or ears 19, 19 which project laterally from upper portions of the support element or web 18.

The base 14 has a width equal to the space between the guide walls 9 and 9. Meanwhile the width of the main portion 15 is slightly smaller than that of the base 14, and the width of the projection 16 is substantially equal to that of the aperture 12.

A cavity 20 is formed in the main portion 15 and opens downwardly at the lower surface of the base 14, and a forward inclined plane 22 is formed in a manner to extend substantially from the vertical center of the back surface 21 of the cavity 20 to the lower end of the projection 16.

Denoted by 23, 23 on FIGS. 6, 7 and 8 are lock elements which are symmetrical with each other.

Each lock element 23 has a cylindrical hub 24 from which extend an L-shaped lock portion 25 and an L-shaped pressure portion 26 formed integrally with the respective hub 24. A fore end 25a of the lock portion 25 serves as a lock prong, and a butt lug 25b projecting from the intermediate position toward the center substantially is opposed to the rear surface of the presser or ear 19 of the slidable locking member 13 in the proximity thereof. Meanwhile the fore end of the pressure portion 26 is equipped with a spring hook 26a bent upward therefrom.

The cylindrical regions or hubs 24, 24 of the lock elements 23, 23 are fitted rotatably on the support pins 11, 11 of the cassette case 2.

Denoted by 27 is a torsion spring including a coiled portion 27a fitted on the support pin 17 of the slidable locking member 13, and two arms 27b, 27b resiliently pressed against the hooks 26a, 26a of the lock elements 23, 23 from the front.

Due to the resilient urging of the torsion spring 27, a clockwise rotary force is applied to the right lock element 23 as seen from above, while a counterclockwise rotary force is applied to the left lock element 23, so that the prongs 25a, 25a of the lock elements 23, 23 are brought into engagement with the gear teeth 7, 7 of the tape reels 3, 3, which are thereby locked against rotation, as shown in FIG. 6.

Furthermore the resilient force of the torsion spring 27 causes a forward movement of the slidable locking member 13, which is thereby shifted up to the position where the forward end of the base 14 is pressed against the stopper wall 10.

Figure 1:
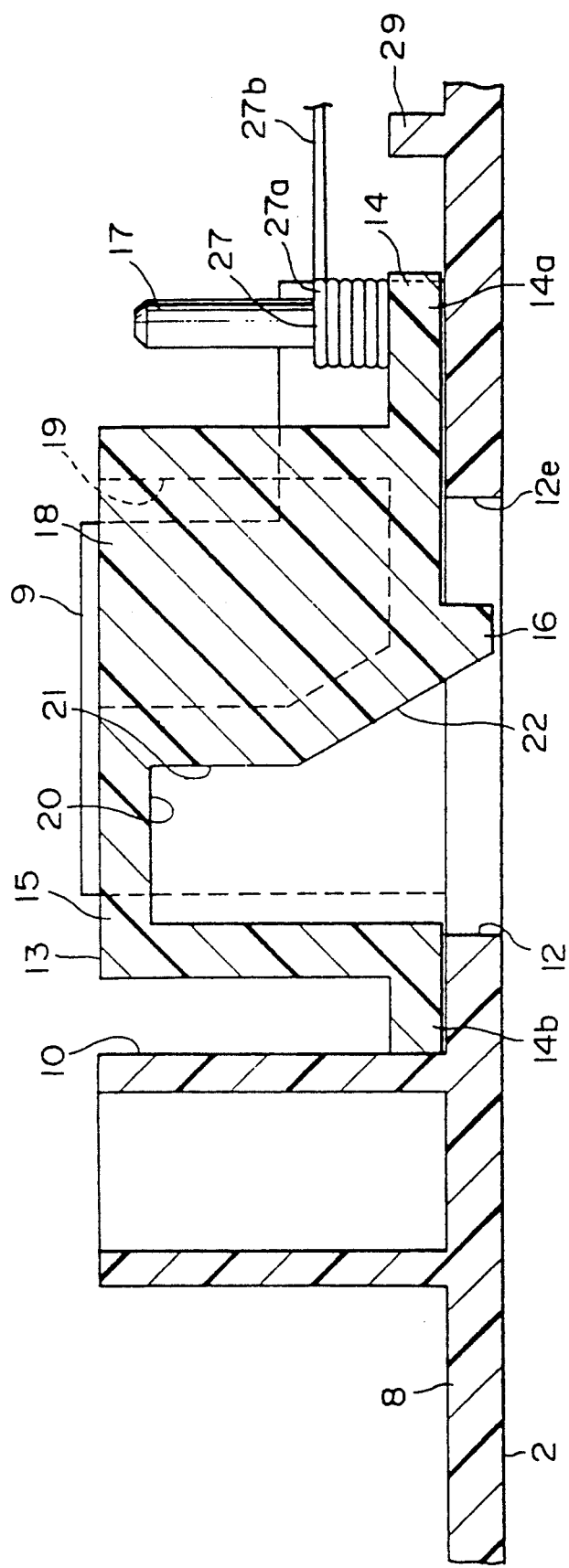
FIG. 1 is an enlarged sectional view of principal components in an embodiment of the present invention representing a tape reel locking/releasing device employed in a tape cassette.

The desired locked state thus attained (as shown in FIG. 6) is maintained during nonuse of the tape cassette 1. In such locked state, the rear end 14a of the base 14 covers a portion of the aperture 12 behind the projection 16, hence serving to protect this portion from dust (as shown in FIG. 1).

When the tape cassette 1 is loaded at a predetermined position in a tape player, the release pin 28 disposed in the tape player is inserted into the cavity 20 of the slidable locking member 13 via the aperture 12 formed in the cassette case 2, so that the slidable locking member 13 is moved backward to release the tape reels 3, 3 from the locked state.

Figure 2:
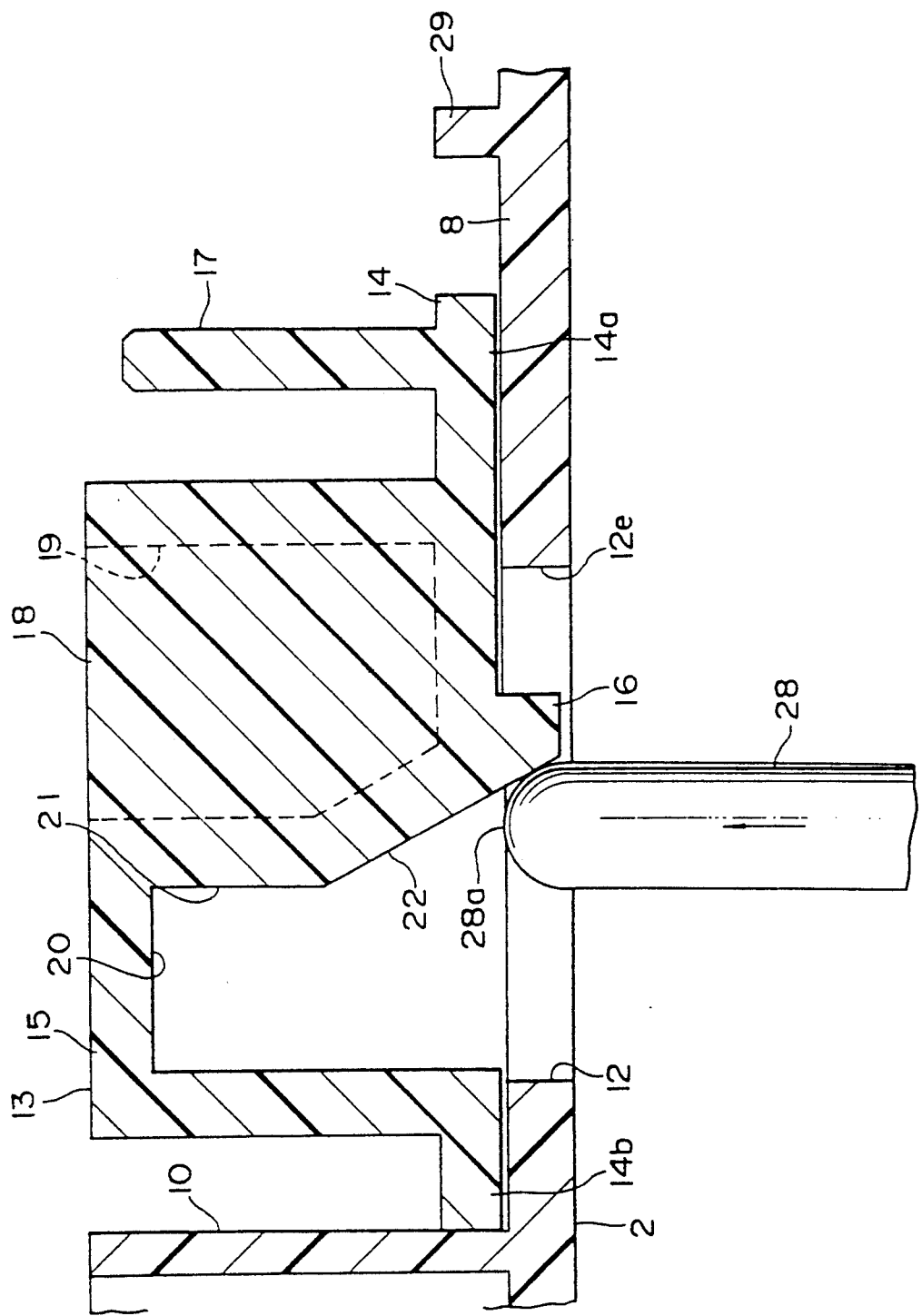
FIG. 2 is an enlarged sectional view of the principal components of the device of FIG. 1 when a releasing operation is initiated.
Figure 3:
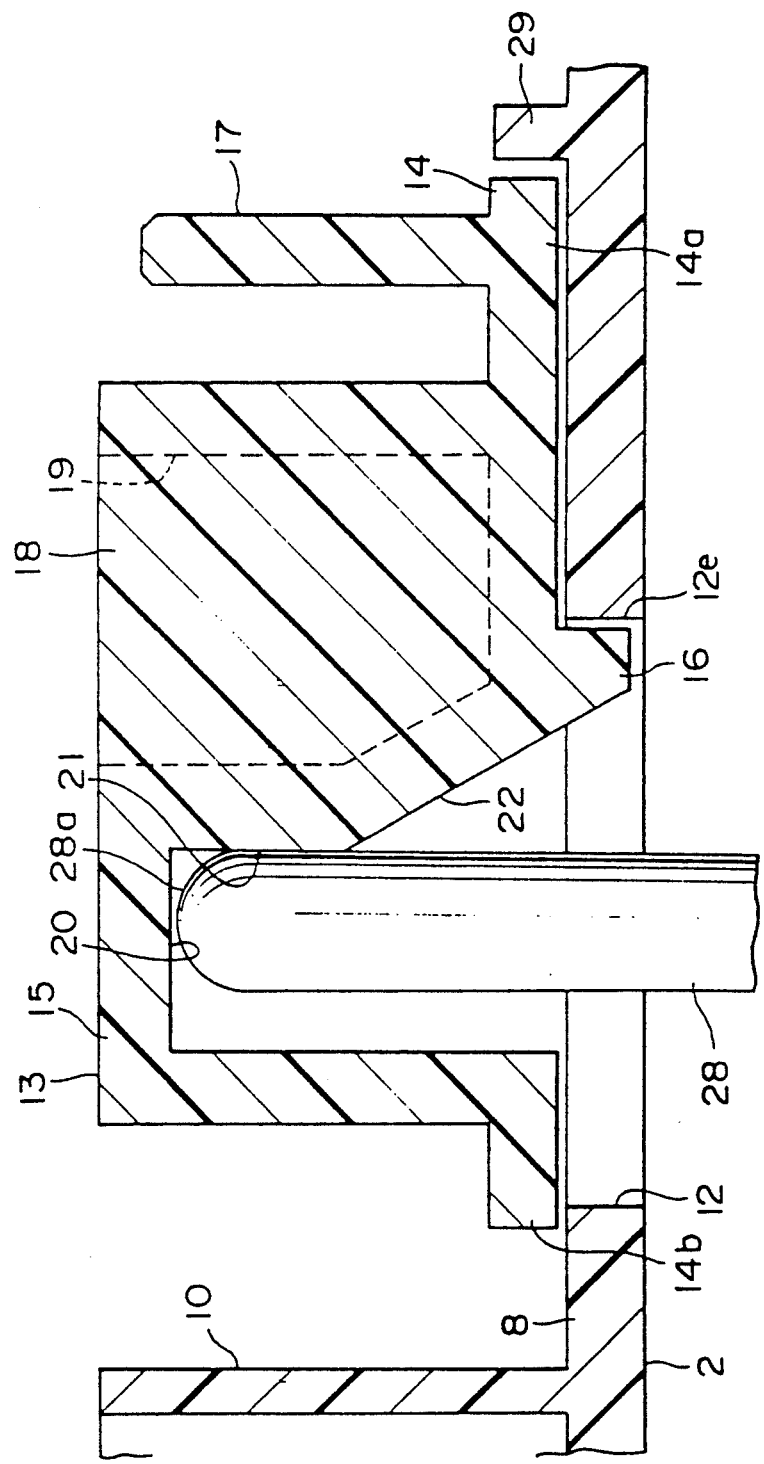
FIG. 3 is another enlarged sectional view of the principal components at the completion of a releasing operation.

More specifically, when the release pin 28 is inserted, first its upper end 28a is brought into pressed contact with the rear end of the inclined plane 22 of the slidable locking member 13 (FIG. 2). Subsequently, in accordance with further vertical insertion of the release pin 28, the contact position of the upper end 28a is advanced upwardly and toward the front of the inclined plane 22 and finally reaches the top end of the cavity 20 beyond the inclined plane 22 (FIG. 3). During the relative upward slide along the inclined plane 22, the upper end 28a of the release pin 28 presses the inclined plane 22 relatively backward, so that the slidable locking member 13 is shifted backward against the resilience of the torsion spring 27.

With such backward shift of the slidable locking member 13, the pressers or ears 19, 19 thereof serve to press the, butt lugs 25b, 25b of the lock elements 23, 23 backward, so that the right lock element 23 is rotated counterclockwise, as seen from above, while the left lock element 23 is rotated clockwise, whereby the lock prongs 25a, 25a thereof are disengaged from the gear teeth 7, 7 of the tape reels 3, 3 to consequently release the tape reels 3, 3 from the locked state, as shown in FIG. 7. In such released state, the fore end 14b of the base 14 covers the front portion of the aperture 12 in the cassette case 2 to prevent entrance of any dust therein, as shown in FIG. 3.

The tape reels 3, 3 are thus released from the locked state. Although the height of the inclined plane 22 remains unchanged as viewed from the bottom wall 8 of the cassette case 2, the length thereof is rendered greater by the extension of its lower end down to the lower end of the projection 16, hence increasing the length of the shift caused by slide contact with the release pin 28 to consequently enhance the certainty of both locking and releasing operations. On the bottom wall 8, a protrusion 29 formed upright behind the aperture 12 functions as a stopper to define the limit in the backward shift of the slidable locking member 13. If the limit in the backward shift of the slidable locking member 13 is determined by the pressed contact of the projection 16 with the rear end 12e of the aperture 12, the protrusion 29 may be eliminated to eventually achieve advantageous effects of reducing the required molding material and preventing a retreat of the bottom surface of the cassette case 2.

As described hereinabove, according to the tape reel locking and releasing device of the present invention, the inclined plane can be lengthened without the necessity of extending its upper end or increasing the gradient of the plane to consequently ensure a sufficient shift length of the slidable locking member. Therefore it becomes possible to avert any incomplete locking or releasing action.

It is to be understood that the preferred embodiment mentioned above represents merely an exemplary structure, and the technical scope of the present invention is not limited thereto alone.

What is claimed is:

1. A device for locking and releasing a pair of tape reels provided rotatably in a cassette housing with a tape wound around the tape reels, said device comprising:

gear teeth formed on the entire peripheries of the tape reels;

a pair of engaging members movably mounted in the cassette housing so as to be engageable with and disengageable from said gear teeth of the tape reels;

a reel locking member slidable in the cassette housing between a locking position and a releasing position and acting on said engaging members to cause disengagement therefrom from said gear teeth in response to sliding of said reel locking member to said releasing position, said slidable reel locking member having a cavity into which an operating member disposed in a signal recording and/or reproducing apparatus is inserted through an aperture formed in a bottom wall of said cassette housing so as to move said reel locking member to said releasing position and thereby disengage said engaging members from said gear teeth; and means for resiliently urging said slidable reel locking member to said locking position for bringing said engaging members into engagement with said gear teeth;

said reel locking member having a projection extending downwardly therefrom into said aperture contiguous to said cavity, and said cavity of said slidable reel locking member having a surface including an inclined plane portion facing downwardly and generally in a direction toward said locking position and extending over said projection, with said operating member being pressed against said inclined plane portion so that the top of said operating member is firstly engaged with an end part of said inclined plane portion on said projection.

2. The device according to claim 1, wherein said projection has a height substantially equal to the thickness of said bottom wall of said cassette housing.

3. The device according to claim 1, wherein said projection and the remainder of said reel locking member are molded to be integral.

4. The device according to claim 1, wherein said projection is engageable with an end of said aperture in said bottom wall for stopping the movement of said reel locking member in the direction toward said releasing position.

* * * * *